3,304,236
PROCESS FOR THE MANUFACTURE OF DESACE-TYL-7-AMINO-CEPHALOSPORANIC ACID
Jakob Nuesch, Riehen, and Hans Bickel, Binningen, Switzerland, assignors to Ciba Corporation, New York, N.Y., a corporation of Delaware
No Drawing. Filed Nov. 16, 1964, Ser. No. 411,592
Claims priority, application Switzerland, Nov. 19, 1963, 14,168/63; Sept. 17, 1964, 12,104/64
15 Claims. (Cl. 195—29)

The present invention provides a new process for the manufacture of desacetyl-7-amino-cephalosporanic acid. This compound is a valuable starting product for the manufacture of therapeutically useful desacetyl-7-acyl-amino-cephalosporanic acids, for example O-desacetyl-O-($\beta$-chloroethylcarbamyl) - 7 - [N'-($\beta$-chlorethyl)-ureido]-cephalosporanic acid.

According to the present process 7-amino-cephalosporanic acid is contacted, in an aqueous medium, with enzymes of microorganisms until substantially all of the 7-amino-cephalosporanic acid is desacetylated, whereupon the desacetyl-7-amino-cephalosporanic acid so formed is isolated in solid form from the aqueous medium.

It is known that cephalosporin C can be deacetylated by enzymes of microorganisms, but this process gives only poor yields of desacetyl-cephalosporin C so that it has no practical significance. In contrast thereto, the process of the invention gives very good yields, namely 80 to 100 of the theoretical yield of desacetyl-7-amino-cephalosporanic acid. It thus constitutes an unexpected technical advance over desacetyl-cephalosporin C, especially with regard to the fact that desacetyl-7-amino-cephalosporanic acid can directly be N-acylated whilst from desacetyl-cephalosporin C first the $\epsilon$-aminoadipic acid radical must be removed before acylation with another acyl group can take place.

Suitable for the deacetylation of 7-amino-cephalosporanic acid are enzymes of microorganisms of the order Actinomycetales (Bergey's Manual), e.g. of bacteria of the family Mycobacteriaceae, Streptomycetaceae, Actinomycetaceae, Streptosporangiaceae, Actinoplanaceae (Bergey's Manual) and of fungi imperfecti and above all of *Bacillus subtilis* which is easy to cultivate. The process can be performed, for example, with enzymes of strains of the following genera and species:

Streptomyces (mesophil), such as *S. viridochromogenes, S. fradiae, S. griseus, S. griseoflavus, S. prasinus*; Streptomyces (thermophil), such as *S. violaceoruber, Thermoactinomyces vulgaris, S. thermovulgaris*; Chainia, such as Actinopycnidium species, Micromonospora species, *Nocardia petroleophila, Streptosporangium roseum, Thermopolyspora polyspora, Thermopolyspora glauca, Mycobacterium tuberculosis* var. BCG; *Mycobacterium phlei*; Cephalosporium, Aspergillus, *Bac. subtilis*.

By contact of 7-amino-cephalosporanic acid with enzymes of microorganisms is to be understood the contact with the microorganisms themselves or their mycelium respectively from which the enzymes get into the aqueous reaction medium as well as the direct contact with the enzymes or extracts containing them.

The microorganisms are obtained by conventional cultivation. The enzymes are obtained for instance by subjecting the microorganisms in aqueous solution to ultrasound and precipitating the enzymes from the aqueous solution for example by means of acetone. The enzymes are contacted with 7-amino-cephalosporanic acid at a temperature ranging from 20 to 37° C., preferably at 27° C. to 35° C. the reaction medium preferably being shaken or stirred with passage of air until the 7-amino-cephalosporanic acid has been completely or substantially converted into desacetyl-7-amino-cephalosporanic acid which is generally the case after 15 to 24 hours. During the incubation the pH is maintained at 6.5 to 7.5, preferably at 7.2 to 7.5. On completion of the reaction the enzyme or cell mass is separated off and the filtrate is concentrated to a small volume. During the evaporation the pH is preferably maintained at about 7. The concentrated solution should contain 5 to 10% of desacetyl-7-amino-cephalosporanic acid; it is slowly adjusted to a pH value from 3.5 to 4.5, advantageously pH=4.2. Starting from pH 7 to lower pH-value, desacetyl-7-amino-cephalosporanic acid begins to settle out at pH 5. The solution of pH about 4.2 is cooled to 0° C. and kept at this temperature for some time (1 to 3 hours). The precipitated desacetyl-7-amino-cephalosporanic acid is then isolated, for example by filtration or centrifugation, and washed with ice water.

The following examples illustrate the invention.

The conversion of 7-amino-cephalosporanic acid into desacetyl-7-amino-cephalosporanic acid was checked by thin-layer chromatography on silica gel in the system n-butanol+glacial acetic acid+pyridine+water (15:3: 10:12). The migration took about 3 hours at 25° C. The chromatograms were developed with a solution of 0.938 g. of ninhydrin and 28 ml. of 2:4:6-collidine in 700 ml. of ethanol and 210 ml. of glacial acetic acid. After having been sprayed with the solution the whole is kept for 10 minutes at 90° C. 7-amino-cephalosporanic acid has an $Rf$ value of 0.43, desacetyl-7-amino-cephalosporanic acid an $Rf$ value of 0.37. The microorganisms used above are kept under the indicated reference numbers at the Federal Swiss Technical University, Institute of Special Botany, and at our own laboratories.

EXAMPLE 1

5 g. of 7-amino-cephalosporanic acid are suspended in a 1-liter vessel equipped with stirrer and glass electrode in 400 ml. of water. A freshly prepared saturated solution of potassium bicarbonate is then stirred in dropwise until the pH has reached 7. The resulting clear solution is then mixed with 100 g. of moist mycelium obtained by cultivating *Streptomyces griseoflavus*, A 28213, and repeatedly washed with distilled water. The suspension is gently stirred for about 15 hours at room tempeacture. During this time the pH is maintained at 6.9 to 7.3, if necessary by adding 2 N-sodium hydroxide solution or 2N-hydrochloric acid. Thin-layer chromatographic examination reveals when the deacetylation is complete. The mycelium is then filtered off and rinsed twice with distilled water. The combined filtrates are concentrated to 50 ml. at 25 to 30° C. and pH 7 under a high vacuum; the concentrate is filtered off and, while being stirred and its pH being checked with the glass electrode, is mixed dropwise with glacial acetic acid until a pH value of 4.2 has been reached. The batch is then cooled to 0° C. and kept at this temperature for one hour; the granular precipitate of desacetyl-7-amino-cephalosporanic acid is then filtered off and washed with a small amount of ice water. If the precipitate should be very finely granular, it is isolated by centrifugation. The filtrate or centrifugate respectively is dried. Yield: 3 g. of desacetyl-7-amino-cephalosporanic acid.

Said strain of *S. griseoflavus* (Krainsky), Waksman et Henrici 1948 (Bergey "Manual of Determinative Bacteriology," Baltimore, 6th edition [1948], page 948), was isolated from a Santa Fe, Argentina, soil specimen. In a mineral-containing medium (Gause) or on yeast extract agar (Pridham et al.) it forms a velvety, ash-gray air mycelium; its Tresner-Danga reaction is negative; on peptone-containing nutrient no melanine is formed. Considerable nitrate reduction. Gelatine liquefaction after 10 days at 27° C. 1.5 cm.; starch hydrolysis after 10 days 1.1 cm.; Spores with short spikes. Spore chains in regular spirals with 3 to 6 coils, monopodially branched.

The strain was cultivated in a submerged culture at 27° C. for 72 hours in a nutrient solution containing 5 g. of glucose, 10 g. of cane sugar, 5 g. of Bacto-trypton, 2.5 g. of yeast extract and tap water to make 1 liter. Prior to sterilization, the pH was adjusted to 7.0 with sodium bicarbonate. The solution is sterilized by heating at 115° C. for 20 minutes.

EXAMPLE 2

1 g. of well washed, moist mycelium of the strain A 28759 of *Streptomyces viridochromogenes* (Krainsky), Waksman et Henrici (1948), (Bergey, see above literature reference, page 942) is mixed with 2 ml. of 0.05-molar phosphate buffer (pH 7) containing 2 mg. of 7-amino-cephalosporanic acid and incubated for 24 hours at 27° C. The mycelium is then isolated on a centrifuge and the clear solution is subjected to thin-layer chromatography. The 7-amino-cephalosporanic acid has been completely converted into desacetyl-7-amino-cephalosporanic acid. The strain A 28759 was isolated from a Tiassale, Ivory Coast, soil specimen. It is characterized by the following features:

Spores roundish-ellipsoid or longish-oval, measuring 0.4 to 1.3μ x 0.3 to 1.0μ, carrying stiff spikes generally measuring 0.2 to 0.4μ.

Air mycelium on mineral-containing nutrient velvety, pale blue; on yeast extract agar woolly, pale blue to blue green.

Spore chains in regular spirals of 3–7 coils; monopodially branched and growing directly out of the substrate or forming on sterile air hyphae in opposite or staggered positions.

Melanine is formed on nutrients containing peptone; Tresner-Danga reaction is positive. Considerable nitrate reduction. Gelatin liquefaction after 10 days at 27° C., 0.5 cm.; starch hydrolyis after 10 days, 1 cm.

The strain is cultivated under the conditions indicated in Example 1.

When the afore-mentioned strain is caused to react under identical test conditions on cephalosporin C, paperchromatographic examination reveals the presence of neither cephalosporin C nor desacetyl-cephalosporin C.

EXAMPLE 3

7-amino-cephalosporanic acid is deactylated as described in Example 2, but with the use of the mycelium of strain A 30498 of *Streptomyces fradiae* (Waksman et Curtis), Waksman et Henrici (Bergey, see above literature reference, page 954).

The strain was isolated from an Addis Ababa, Abyssinia, soil specimen and is characterized by the following features:

Spores smooth. Air mycelium on mineral-containing nutrient velvety, pale crimson; on yeast extract agar brown-red. Spore chains in narrow, closed spirals of 2–5 coils; monopodially branched. No melanine formation on peptone-containing nutrient. No nitrate reduction. Gelatin liquefaction after 10 days at 27° C., 1 cm.; starch hydrolysis after 10 days, 2 cm.

The strain is cultivated under the conditions indicated in Example 1.

EXAMPLE 4

When 7-amino-cephalosporanic acid is treated as described in Example 2, but with the use of the mycelium of strain A 27744 of *Streptomyces lavendulae* (Waksman et Curtis), Waksman et Henrici (Bergey, see above literature reference, page 944), 80% of the starting material is converted into desacetyl-7-amino-cephalosporanic acid.

The strain was isolated from a soil specimen from Campo Baixo Guando, Brazil. It reveals the following characteristic features:

Spores smooth. Air mycelium on mineral-containing nutrient pale crimson; on yeast extract agar pale crimson-cinnamon brown. Spore chains monopodially branched; short, loose, irregular spirals of 1–4 coils only at the ends of long, straight pieces; melanine formation on peptone-containing nutrient. Hardly any nitrate reduction. Hardly any gelatine liquefaction after 10 days; starch hydrolysis after 10 days 4 mm. The strain is cultivated under the conditions indicated in Example 1.

EXAMPLE 5

7-amino-cephalosporanic acid is completely converted into the desacetyl compound when it is reacted, as described in Example 2, with the mycelium of one of the following strains:

(1) *Streptomyces griseus* Waksman et Henrici 1943 (Proc. Nat. Acad. Sc. 45, 10 [1959]), strain A 28613; isolated from a soil specimen from Semien, Ivory Coast.

Characteristics: Spores smooth. Air mycelium on mineral-containing nutrient powdery, white as chalk; on yeast extract agar velvety, whitish yellow. Spore chains straight or undulated; sympodially branched. No melanine formation. Considerable nitrate reduction. Gelatin liquefaction after 10 days at 27° C., 2.5 cm.; starch hydrolysis after 10 days, 5 mm.

(2) *Streptomyces griseoflavus* (Krainsky) Waksman et Henrici (Bergey, l.c. page 948), strain A 25189, isolated from a soil specimen from Toowoosuba, Queensland, Australia.

Characteristics: Spores with short spikes. Air mycelium on mineral-containing nutrient velvety, whitish gray; on yeast extract agar ash-gray. Spore chains in regular spirals of 2–6 coils; monopodially branched, with long, straight main axis. No melanine formation. Slight nitrate reduction. Gelatin liquefaction after 10 days, 1 cm.; starch hydrolysis after 10 days, 1 cm.

(3) *Streptomyces prasinus* Ettlinger et al. (Arch. Mikrobiol., 31, page 343 [1958]), strain A 25708; isolated from a Bihar, India, soil specimen.

Characteristics: Air mycelium on mineral-containing nutrient and yeast extract agar leek-green, velvety. No melanine formation; negative Tresner-Danga reaction. Slight nitrate reduction. Gelatin liquefaction after 10 days at 27° C., 3 cm.; starch hydrolysis after 10 days, 3 mm. Spores with stiff spikes. Spore chains monopodially branched, with long, straight main axis, regular spirals of 1–4 coils.

The strains are cultivated under the conditions indicated in Example 1.

Ninety further strains of the genus Streptomyces also deacylated 7-amino-cephalosporanic acid.

EXAMPLE 6

The moist cell sediment obtained by centrifuging a culture of *Streptomyces violaceoruber* A 31529 (Waksman et Curtis) Kutzner et Waksman 1959, J. of Bacteriol., 78, page 539 (1959) is mixed at the ratio 1:3 (volume:volume) with 0.05-molar phosphate buffer according to Sörensen of pH 7 with 0.1% 7-amino-cephalosporanic acid. 3 ml. of the resulting suspension are agitated in a 50 ml. Erlenmeyer flask at 27° C. for 24 hours. The mycelium is then separated. Thin layer chromatography reveals the presence of the desacetyl-7-amino-cephalosporanic acid in the clear solution.

In the same manner desacetyl-7-amino-cephalosporanic acid is obtained when the mycelium of the following Actinomycetes strains is used for the deacetylation:

*Thermoactinomyces vulgaris*, Tskiklinsky, 1899, strain A 31509, Ann. Inst. Pasteur, 13, 500 (1899). cf. Küster E., and R. Locci, Internat. Bull. Bact. Nomencl. Taxon 14, (3) 109 (1964);

*Streptomyces thermovulgaris*, Henssen 1957, strain A 24178, Arch. Mikrobiol., 26, 373 (1957), strain Henssen R 35;

Actinopycnidium species strain A 28904, isolated from soil specimens from Plantation de Manioc, Savan, konii, coll. 12.9.61 on salt medium. Actinopycnidium cf. Krassilnikov, N., A., Mikrobiol., 31, 250, (1962);

Micromonospora species strain A 20242; origin: NRRL B–944; cf. Orstov, J., Investigations into the morphology of the ray fungi; Inaug. Diss. Kopenhagen: Levin and Munksgaard 1923;

*Nocardia petroleophila*, Hirsch et Engel 1956, strain A 28400 (Hirsch, P., and H. Engel, Ber. deutsch, bot.. Ges., 69, 441 (1956);

*Streptosporangium roseum*, Couch 1955, Jour. Elistra Mitchell Scientific Soc., 71, 148 (1955), strain ATCC 12428;

*Thermopolyspora polyspora*, Henssen 1957, strain A 31521, cf. A. Henssen 1957, Arch. Mikrobiol., 26, 373 (1957);

*Thermopolyspora polyspora*, Henssen 1957, strain A 31524, cf. A. Henssen 1957, Arch. Mikrobiol., 26, 373 (1957);

*Thermopolyspora polyspora*, Henssen 1957, strain A 31525, cf. A. Henssen 1957, Arch. Mikrobiol, 26, 373 (1957);

*Thermopolyspora polyspora*, Henssen 1957, strain A 31526, cf. A. Henssen 1957, Arch. Mikrobiol., 26, 373 (1957);

*Thermopolyspora glauca*, Corbaz et al. 1963, strain A 31533, Corbaz R., P. H. Gregory and M. E. Lacey, J. gen. Microbiol., 32, 449 (1963).

The strains are cultivated in the same manner as described in Example 1.

EXAMPLE 7

*Mycobacterium tuberculosis* var. BCG is cultivated on Sauton medium in known manner, and the moist cell sediment caused to react with 7-amino-cephalosporanic acid as described in Example 6. An 80% yield of desacetyl-7-amino-cephalosporanic acid is obtained.

In the same manner *Mycobacterium phlei* can be used for the deacetylation of 7-amino-cephalosporanic acid. This bacterium can be cultivated for example in the following nutrient solution: 5.0 g. of glucose, 5.0 g. of peptone, 5.0 g. of meat extract, 1.0 g. of $Na_2HPO_4$, 12 $H_2O$, and deionized $H_2O$ to make 1000 ml.

Prior to sterilization the pH is adjusted to 7.5 with potassium hydroxide; when the batch has been in an autoclave at 121° C. for 20 minutes, the pH is 7.0.

EXAMPLE 8

Various strains of the genera Cephalosporium and Aspergillus are cultivated and the moist cell sediment caused to react with 7-amino-cephalosporanic acid as described in Example 6. The desacetyl-7-amino-cephalosporanic acid is determined by thin-layer chromatography.

The following nutrient solution is used for the cultivation:

| | G. |
|---|---|
| Saccharose | 10.00 |
| Pepton | 1.00 |
| $MgSO_4 \cdot 7H_2O$ | 0.30 |
| $KH_2PO_4$ | 1.00 |
| NaCl | 0.01 |
| $CaCl_2$ | 0.10 |
| $FeCl_3$ | 0.01 |
| $MnCl_2$ | 0.01 |
| $ZnSO_4$ | 1.00 |
| $CuSO_4$ | 0.10 |

$H_2O$, deionized, to make 1000 ml.

| | |
|---|---|
| pH before sterilization with KOH/HCl | 4.6–4.8 |
| Autoclave treatment 20′ ° C | 115 |
| pH after sterilization | 4.5–5.0 |

EXAMPLE 9

60 g. of 7-amino-cephalosporanic acid (75%) are suspended in 1200 ml. of deionized water in a 3-liter vessel which is equipped with a glass electrode and a stirrer and is in a water bath having a temperature of 35° C. 2 N-sodium hydroxide solution is stirred in until a pH value of 7.2–7.5 is reached. The clear solution is then treated with 15 g. of cell-lyophilizate of *Bacillus subtilis* ATCC 6633 and the suspension stirred for 4 hours at 35° C. During this time, the pH is constantly kept between 7.2 and 7.5 by adding 2 N-sodium hydroxide solution. Deacetylation is checked by thin-layer chromatography. When the reaction is complete, the suspension is cooled to 20° C. and treated, while being stirred, with 1200 ml. of methanol and 30 g. of Hyflo. The suspension is suction-filtered through another 60 g. of Hyflo, and the filter cake washed with 200 ml. of methanol+water (1:1). The filtrate is concentrated in a rotary evaporator to about 1200 ml. Concentrated hydrochloric acid is added to the resulting concentrate with stirring until a pH of 4.2 is reached. During this addition, the desacetyl-7-amino-cephalosporanic acid precipitates as a fine granulate. The bath is allowed to stand at 0° C. for 2 hours and the precipitate filtered off and washed with 50 ml. of water, then three times with 100 ml. of methanol+water (2:1) and dried at 35–40° C. in a vacuum cabinet. 32.6 g. of desacetyl-7-amino-cephalosporanic acid are obtained.

The cell lyophilizate is prepared as follows:

300 liters of a 24-hour culture of *Bacillus subtilis* ATCC 6633 in glucose bouillon are cooled to 4° C. and centrifuged. 2.8 kg. of a moist sediment are obtained and are homogenized with 1.4 liters of deionized water. The resulting suspension is treated, while being stirred, with 14 liters of acetone and stirring is continued for 30 minutes. The suspension is allowed to stand at 0–5° C. for 15 hours, the supernatant solution decanted and the remaining suspension filtered. The filter residue is washed with 2 liters of acetone+water (4:1) and twice with 2 liters of acetone. The filter residue (2.7 kg.) is then stirred for 3 hours at 20–25° C., centrifuged, the centrifuged residue (2.24 kg.) homogenized with 2.2 liters of deionized water, and lyophilized. 360 g. of lyophilizate in the form of a gray powder are obtained.

What is claimed is:

1. Process for the manufacture of desacetyl-7-amino-cephalosporanic acid, wherein 7-amino-cephalosporanic acid is contacted, in aqueous medium, with an enzyme of a strain of microorganism selected from the group consisting of strains of the order Actinomycetales and *Bacillus subtilis* until substantially all of the 7-amino-cephalosporanic acid is desacetylated, and the desacetyl-7-amino-cephalsosporanic acid is separated in solid form from the aqueous medium.

2. Process according to claim 1, wherein enzymes of strains of the genus Streptomyces are used.

3. Process according to claim 1, wherein the reaction is performed with the enzyme of *Streptomyces viridochromogenes*.

4. Process according to claim 1, wherein the reaction is performed with the enzyme of *Streptomyces fradiae*.

5. Process according to claim 1, wherein the reaction is performed with the enzyme of *Streptomyces griseus*.

6. Process according to claim 1, wherein the reaction is performed with the enzyme of *Streptomyces griseoflavus*.

7. Process according to claim 1, wherein the reaction is performed with the enzyme of *Streptomyces prasinus*.

8. Process according to claim 1, wherein the reaction is performed with the enzyme of *Bac. subtillis* ATCC 6633.

9. Process according to claim 1, wherein the reaction is performed at a temperature between 20 and 37° C.

10. Process according to claim 1, wherein the reaction is performed at a pH of 6.5–7.5.

11. Process according to claim 1, wherein on completion of the reaction the aqueous solution containing desacetyl-7-amino-cephalosporanic acid is concentrated at a pH of about 7.

12. Process according to claim 11, wherein on completion of the reaction the aqueous solution is concentrated to a 5–10% content of desacetyl-7-amino-cephalosporanic acid.

13. Process according to claim 1, wherein desacetyl-7-amino-cephalosporanic acid is isloated from a 5 to 10% aqueous solution adjusted to a pH of 3.5–4.5.

14. Process according to claim 13, wherein desacetyl-7-amino-cephalosporanic acid is isolated from a solution of pH 4.2.

15. Process according to claim 1, wherein the desacetyl-7-amino-cephalosporanic acid is isolated in crystalline form from an aqueous solution at 0° C.

References Cited by the Examiner

UNITED STATES PATENTS 3,157,648  11/1964  Collins _____ 195—30 X
3,239,394  3/1966  Walton _____ 195—36

OTHER REFERENCES

Demain, A. L., et al., Nature, 199, 909–910, Aug. 31, 1963.

A. LOUIS MONACELL, *Primary Examiner.*

L. M. SHAPIRO, *Assistant Examiner.*